United States Patent
Langenwalter

(10) Patent No.: US 9,966,749 B1
(45) Date of Patent: May 8, 2018

(54) INSTALLATION FOR EXTENDING AN ELECTRICAL WIRING INTO A JUNCTION BOX

(71) Applicant: Brandon P. Langenwalter, Belle Glade, FL (US)

(72) Inventor: Brandon P. Langenwalter, Belle Glade, FL (US)

(*) Notice: Subject to any disclaimer, the term of this patent is extended or adjusted under 35 U.S.C. 154(b) by 0 days. days.

(21) Appl. No.: 15/660,934

(22) Filed: Jul. 26, 2017

Related U.S. Application Data

(60) Provisional application No. 62/370,001, filed on Aug. 2, 2016.

(51) Int. Cl.
- *H02G 3/06* (2006.01)
- *H02G 3/16* (2006.01)
- *H02G 15/10* (2006.01)
- *H02G 3/08* (2006.01)

(52) U.S. Cl.
CPC ............... *H02G 3/16* (2013.01); *H02G 3/06* (2013.01); *H02G 3/0683* (2013.01); *H02G 3/083* (2013.01); *H02G 15/10* (2013.01)

(58) Field of Classification Search
CPC ............................ H02G 3/0683; H02G 3/083
See application file for complete search history.

(56) References Cited

U.S. PATENT DOCUMENTS

| | | | | |
|---|---|---|---|---|
| 4,657,212 A * | 4/1987 | Gilmore | ............ | F16C 1/103 24/453 |
| 5,132,493 A * | 7/1992 | Sheehan | ............ | H02G 3/06 174/655 |
| 5,539,152 A * | 7/1996 | Gretz | ............ | H02G 3/0683 174/663 |
| 5,789,706 A * | 8/1998 | Perkins | ............ | H02G 3/0691 174/135 |
| 5,905,230 A * | 5/1999 | Marik | ............ | H02G 3/0691 174/651 |
| 6,034,326 A * | 3/2000 | Jorgensen | ............ | H02G 3/0691 174/660 |
| 6,797,877 B1 * | 9/2004 | Burnette | ............ | H02G 3/0683 138/177 |
| 7,488,905 B2 * | 2/2009 | Kiely | ............ | H01R 13/745 174/650 |
| 8,410,378 B1 * | 4/2013 | Senseney | ............ | H02G 3/0616 174/650 |

(Continued)

*Primary Examiner* — Hung V Ngo
(74) *Attorney, Agent, or Firm* — H. John Rizvi; Gold & Rizvi, P.A.

(57) ABSTRACT

An installation for extending an electrical wiring into a junction box comprises an electrical bushing including a bushing body having an outer diameter corresponding to an inner diameter of an orifice in a junction box. A bushing bore extends through the bushing. A bushing collar terminates the bushing body. Exterior bushing threads are on the bushing body adjacent to the bushing collar. In a typical junction box installation, an end connector on a flex cord may be coupled to the bushing body, for instance by threading of the end connector onto interior bushing threads in the bushing body. The electrical bushing may be inserted through and secured in an orifice in a junction box by threading a nut on the exterior bushing threads. Accordingly, the electrical bushing prevents the end connector on the flex cord from inadvertently falling from the orifice in the junction box.

20 Claims, 8 Drawing Sheets

(56) References Cited

U.S. PATENT DOCUMENTS

| | | | | |
|---|---|---|---|---|
| 8,708,374 B1* | 4/2014 | Smith | ................... | H02G 3/0683 |
| | | | | 285/150.1 |
| 9,831,649 B1* | 11/2017 | Gretz | ...................... | H02G 3/088 |
| 2004/0046385 A1* | 3/2004 | Shemtov | ................. | F16L 25/08 |
| | | | | 285/139.1 |
| 2006/0289194 A1* | 12/2006 | Kiely | ................... | H01R 13/745 |
| | | | | 174/78 |

* cited by examiner

INSTALLATION FOR EXTENDING AN ELECTRICAL WIRING INTO A JUNCTION BOX

CROSS-REFERENCE TO RELATED APPLICATIONS

This application claims the benefit of U.S. Provisional Patent Application Ser. No. 62/370,001, filed on Aug. 2, 2016, which is incorporated by reference herein in its entirety.

FIELD OF THE INVENTION

The present invention relates generally to electrical junction boxes, and more particularly, to an installation for extending an electrical wiring into a junction box, the installation comprising an electrical bushing with collar which facilitates addition of one or more electrical lines to an existing junction box when only a large orifice in the junction box is available and a matching large flex cord and flex cord end connector are not available.

BACKGROUND OF THE INVENTION

Electrical junction boxes are commonly used to establish and conceal electrical connections between electrical components such as lights and light switches. Junction boxes are frequently mounted in ceilings, under floors, behind access panels in domestic or commercial buildings. Junction boxes may be embedded in a wall or floor and may include built-in terminals for connecting wiring to the electrical components.

As illustrated in FIGS. 1 and 2, a typical conventional junction box installation 100 includes an electrical junction box 101 having rear or side orifices 104 on a rear or side wall 101a of the junction box 101, respectively, through which wires (not shown) extend into and out of the junction box 101. In the walls of a building, the wires may be sheathed inside a flex cord 110. An end connector 106 may be attached to the end of the flex cord 110 by a screw 114. The flex cord 110 may be attached to the junction box 101 by installation of the end connector 106 in one of the orifices 104. This may be accomplished by, for example, inserting a threaded, end portion 108 of the end connector 106 through the orifice 104 until a stop flange 109 on the end connector 106 engages an exterior surface 102 of the wall 101a of the junction box 101, and then threading and tightening a nut 112 on the end portion 108 against an interior surface 103 of the wall 101a of the junction box 101.

Electrical junction boxes 101 often include a pair of disparately-sized rear orifices, for instance a smaller orifice 104 as shown in FIGS. 1 and 2 and a larger orifice 105 shown in FIGS. 3 and 4. For instance, the smaller orifice 104 may have a ½-inch (1.27 cm) diameter, whereas the larger orifice 105 may have a ¾-inch (1.905 cm) diameter.

The junction box 101 is often initially installed with fewer electrical components than its capacity (e.g., a single switch); thus, fewer incoming and outgoing wires are required. In such cases, the smaller orifice 104 may be generally used, and a suitable smaller diameter flex cord end connector 106 may attached to the junction box 101 at the smaller orifice 104.

In the event that additional wires subsequently need to be connected to the junction box 101 (e.g., to install an additional switch), it may be necessary to use the larger orifice 105 for this purpose. However, a flex cord end connector that is sized to match the diameter of the larger orifice 105 may not be available. Thus, a smaller-sized end connector 106 which fits the smaller orifice 104 may need to be used instead. Accordingly, a junction box installation 124 may be carried out as shown in FIGS. 3 and 4. Specifically, a washer 116, a first nut 120 and an inner, non-threaded T-shaped adapter 118 are threaded onto the end portion 108 of the end connector 106 to increase the overall diameter of the threaded, end portion 108. The first nut 120 and a neck portion 109a of the T-shaped adapter 118 are shaped and sized to snugly fit into the larger orifice 105. The smaller end portion 108 of the end connector 106, fitted with the first nut 120 and T-shaped adapter 118, is inserted into the larger orifice 105 and snugly fits into the larger orifice 105. The washer 116 rests against the exterior surface 102 of the wall 101a of the junction box 101 while a flange portion 109b of the T-shaped adapter 118 rests against the interior surface 103 of the wall 101a of the junction box 101. A second nut 122 may then be threaded onto the remaining length of the end portion 108 of the end connector 106 and tightened against the T-shaped adapter 118. This installation technique, however, has several drawbacks. For example, as mentioned heretofore, the first nut 120 should preferably be of sufficient size to fit snugly within the larger orifice 105. This renders the end connector 106 difficult to install. Additionally, the washer 116, the first nut 120 and the adapter 118 may occupy a significant length of the end portion 108 of the end connector 106, leaving a very small portion of the end portion 108 which is available for attaching the second nut 122. Therefore, during installation, the second nut 122 may easily slip off the end portion 108 of the end connector 106, causing the end connector 106 to fall from the orifice 105 into the junction box 101 and requiring that the end connector 106 again be fished back through the orifice 105 and secured therein to attach the flex cord 110 to the junction box 101.

Accordingly, there is an established need for a device or mechanism which facilitates addition of one or more electrical lines to an existing junction box when only a large orifice in the junction box is available and a matching large flex cord and flex cord end connector are not available.

SUMMARY OF THE INVENTION

The present invention is directed to an installation for extending an electrical wiring comprised of one or more electrical wires into a junction box, the installation comprising an electrical bushing with collar which facilitates addition of one or more electrical lines to an existing junction box when only a large orifice in the junction box is available and a matching large flex cord and flex cord end connector are not available. The electrical bushing provides an adapter which increases the overall outer diameter and the overall threaded length of the flex cord end connector, allowing the flex cord end connector to be snugly fitted into the larger orifice and to more firmly receive the threading of a nut on the interior side of the junction box. Thus, the electrical bushing allows securing a relatively smaller end connector into a relatively larger orifice and prevents the end connector from inadvertently falling from the relatively larger orifice.

In a first implementation of the invention, an installation for extending an electrical wiring into a junction box comprises an electrical bushing including a bushing body having a proximal end, a distal end and an outer diameter corresponding to an inner diameter of an orifice in a wall of a junction box. The electrical bushing further includes a bushing collar extending radially outward from the bushing body, a bushing bore extending through the bushing body and the bushing collar, and exterior bushing threads on the bushing body and arranged distally from the bushing collar. The installation further includes a nut configured to thread onto the exterior bushing threads on the bushing body, an end connector including an end portion, and a flex cord. The electrical bushing, the nut, the end connector and the flex cord are configured to adopt an installed configuration in which the bushing body of the electrical bushing extends through the orifice in the wall of the junction box, with the exterior bushing threads of the bushing body protruding inwardly from an interior surface of the wall, and with the nut threaded onto the exterior bushing threads and the bushing collar and nut sandwiching the wall and holding the electrical bushing in place relative to the wall. In this installed configuration, the end portion of the end connector is received within the bushing bore and is coupled to the electrical bushing. In addition, the flex cord is coupled to the end connector.

In a second aspect, the end portion of the end connector can be a threaded portion.

In another aspect, in the installed configuration, the exterior bushing threads on the bushing body can extend distally from the threaded, end portion of the end connector.

In another aspect, in the installed configuration, the threaded, end portion of the end connector can be coupled to the electrical bushing by the threading of the threaded, end portion of the end connector onto interior bushing threads comprised in the bushing body and arranged facing the bushing bore.

In another aspect, the electrical bushing can include a non-threaded interior bushing shoulder at the proximal end of the bushing body and adjacent to the interior bushing threads of the bushing body.

In another aspect, in the installed configuration, the bushing collar can rest on an exterior surface of the wall opposite to the interior surface of the wall.

In another aspect, in the installed configuration, the nut can rest on the interior surface of the wall.

In another aspect, the bushing collar can be arranged at the proximal end of the bushing body.

In another aspect, the exterior bushing threads can be adjacent to the distal end of the bushing body.

In another aspect, in the installed configuration, the distal end of the bushing body can protrude distally from a distal end of the end portion of the end connector.

In another aspect, the bushing body can include an outer, non-threaded orifice- engaging portion between the bushing collar and the exterior bushing threads. In the installed configuration, the orifice-engaging portion can be received within the orifice.

In another aspect, the end portion of the end connector can include a stop flange. In the installed configuration, the stop flange can engage the bushing collar on the electrical bushing.

In another aspect, the exterior bushing threads of the bushing body can cover at least half of the length of the bushing body.

In another aspect, the bushing body can be elongated and cylindrical.

In another aspect, the outer diameter of the bushing body can be about ¾ inches.

In another aspect, the bushing bore can have a diameter of about ½ inch.

In another aspect, the installation can further include the junction box.

Introducing a further illustrative embodiment of the invention, the present invention includes an electrical bushing with collar which facilitates addition of one or more electrical lines to an existing junction box when only a large orifice in the junction box is available and a matching large flex cord and flex cord end connector are not available, comprising:
 a bushing body having an outer diameter corresponding to an inner diameter of an orifice in a junction box;
 a bushing collar terminating the bushing body;
 a bushing bore extending through the bushing body and the bushing collar; and
 exterior bushing threads on the bushing body.

In another aspect, the electrical bushing can further include interior bushing threads in the bushing body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
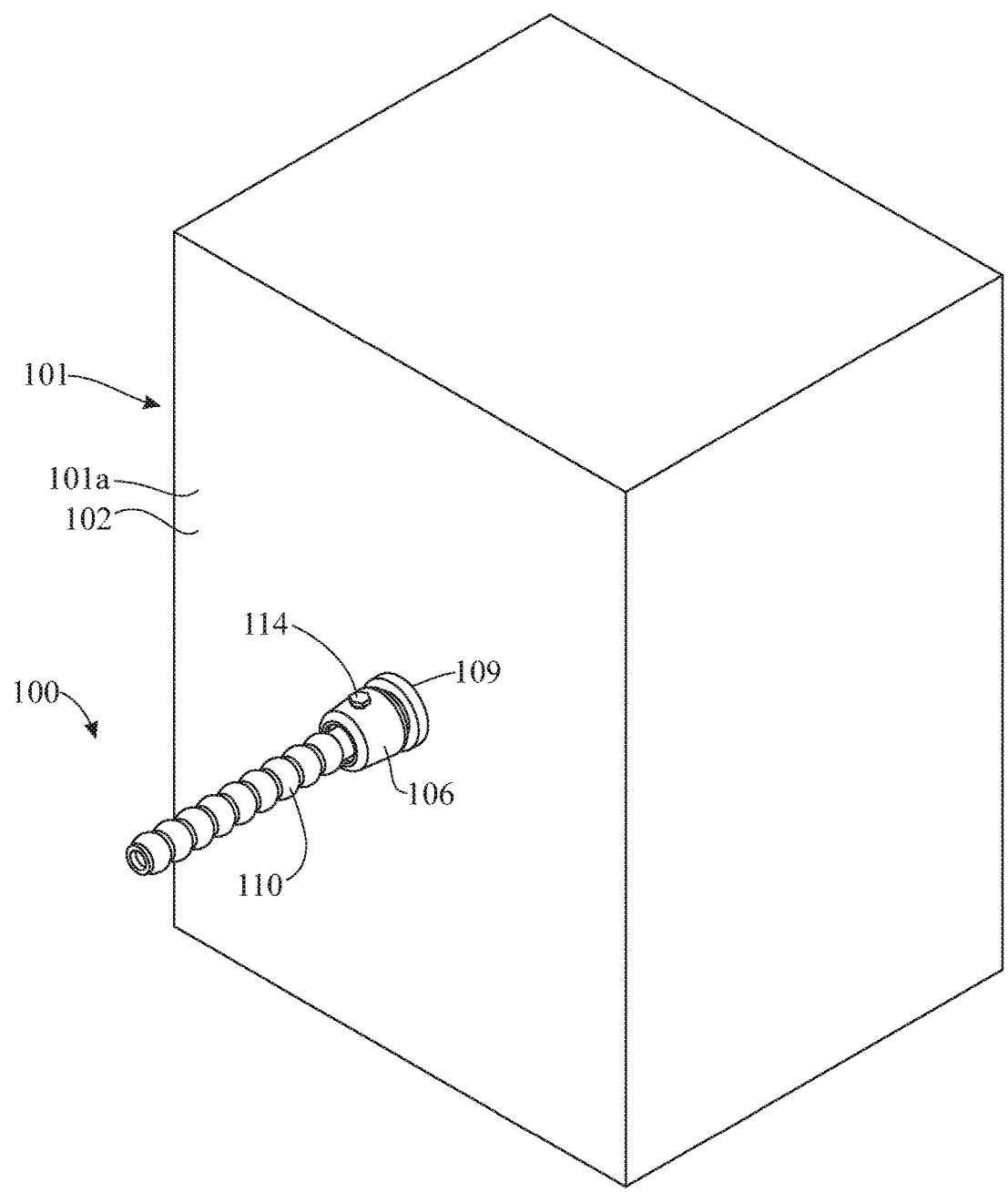
FIG. 1 presents a top, rear perspective view of a first junction box installation known in the prior art.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an electrical bushing with collar which facilitates addition of one or more electrical lines to an existing junction box when only a large orifice in the junction box is available and a matching large flex cord and flex cord end connector are not available.

Figure 2:
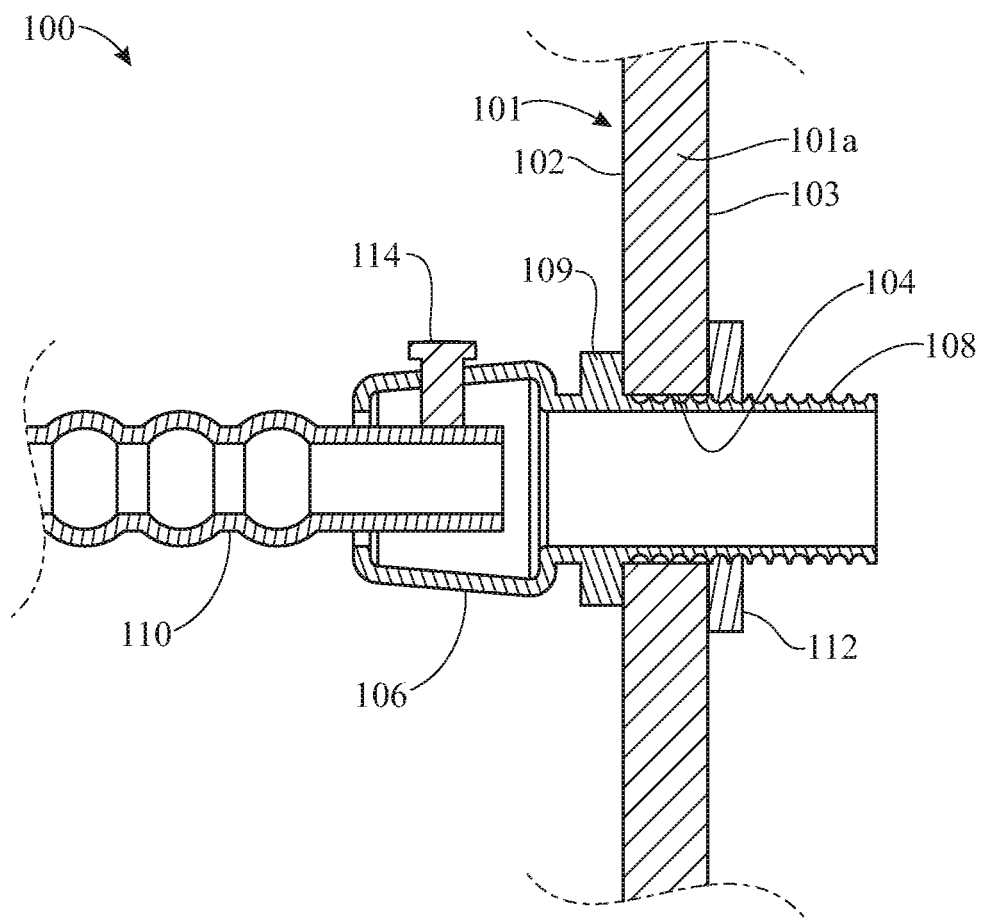
FIG. 2 presents an enlarged, cross-sectional side elevation view of the junction box installation illustrated in FIG. 1.
Figure 3:
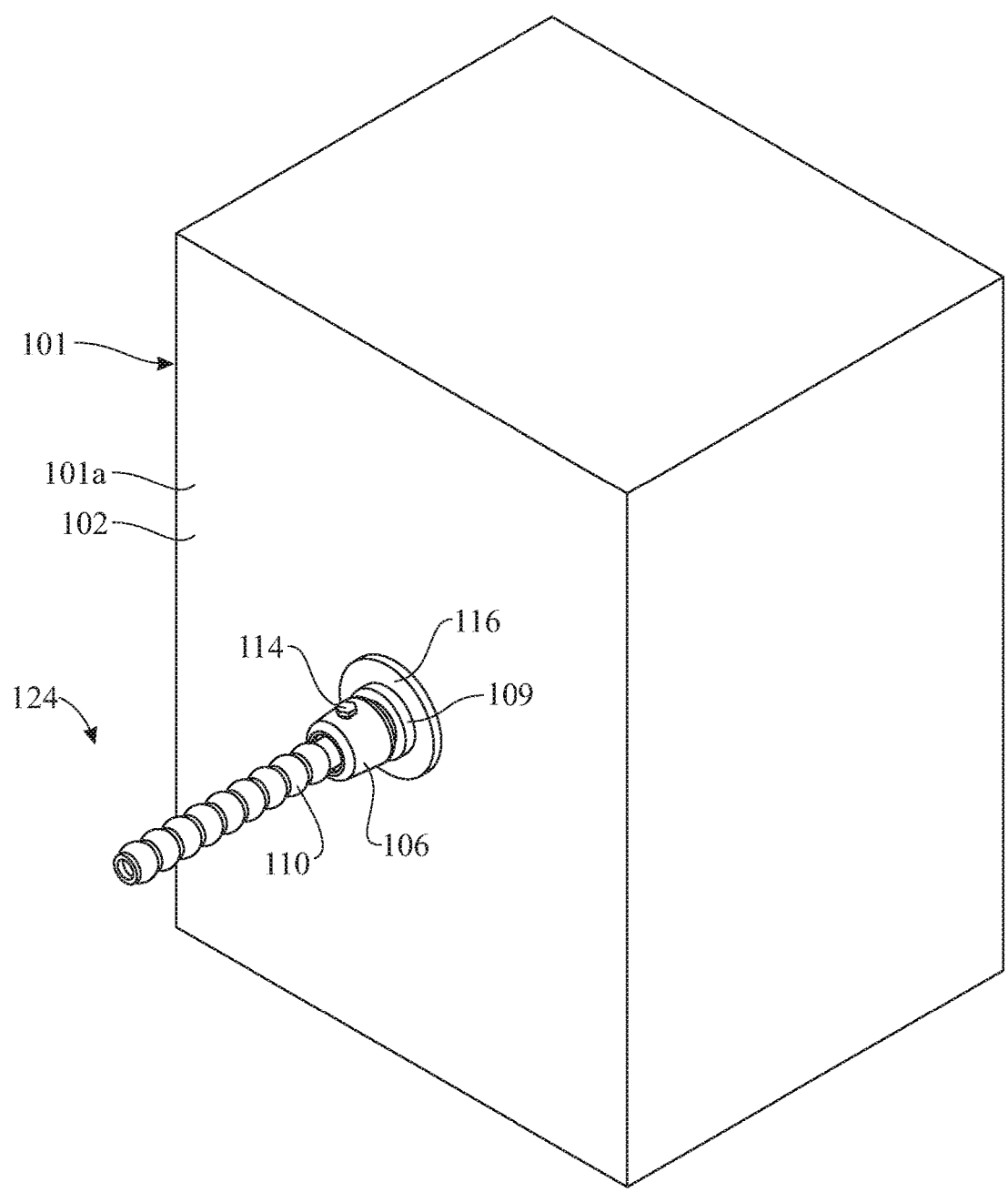
FIG. 3 presents a top, rear perspec of a second junction box installation known in the prior art.
Figure 4:
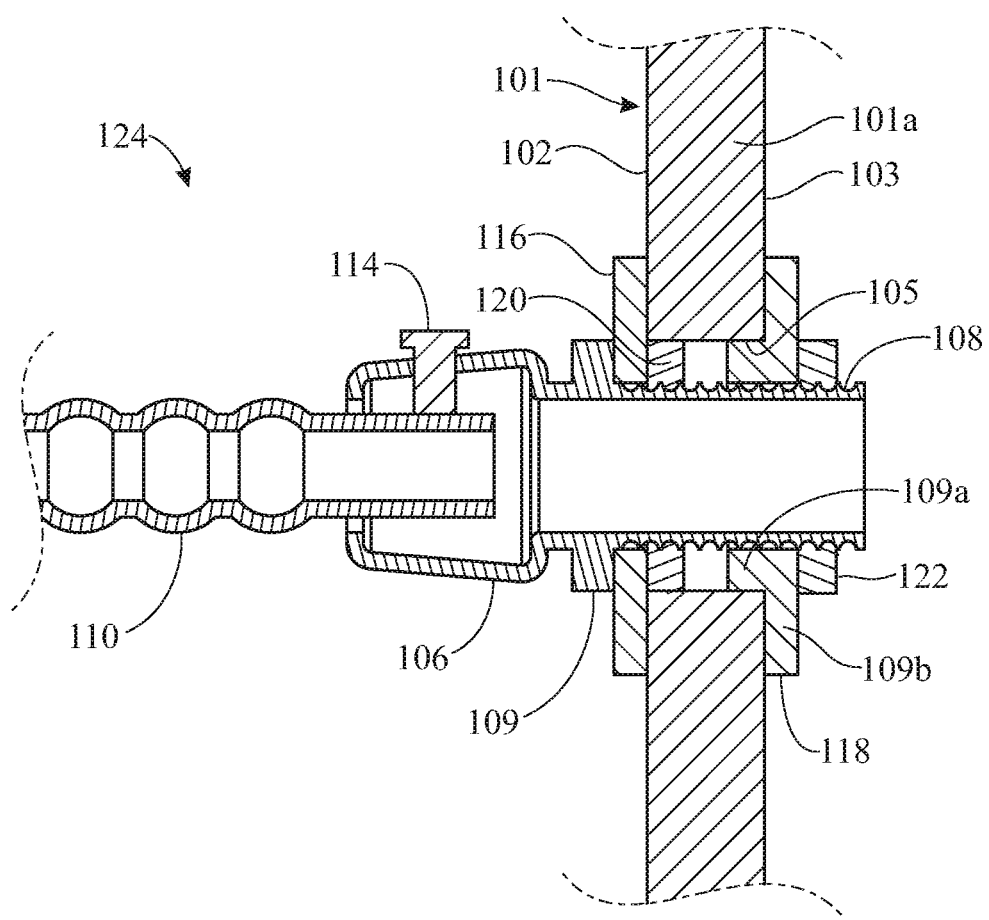
FIG. 4 presents an enlarged, cross-sectional side elevation view of the junction box installation illustrated in FIG. 3.
Figure 5:
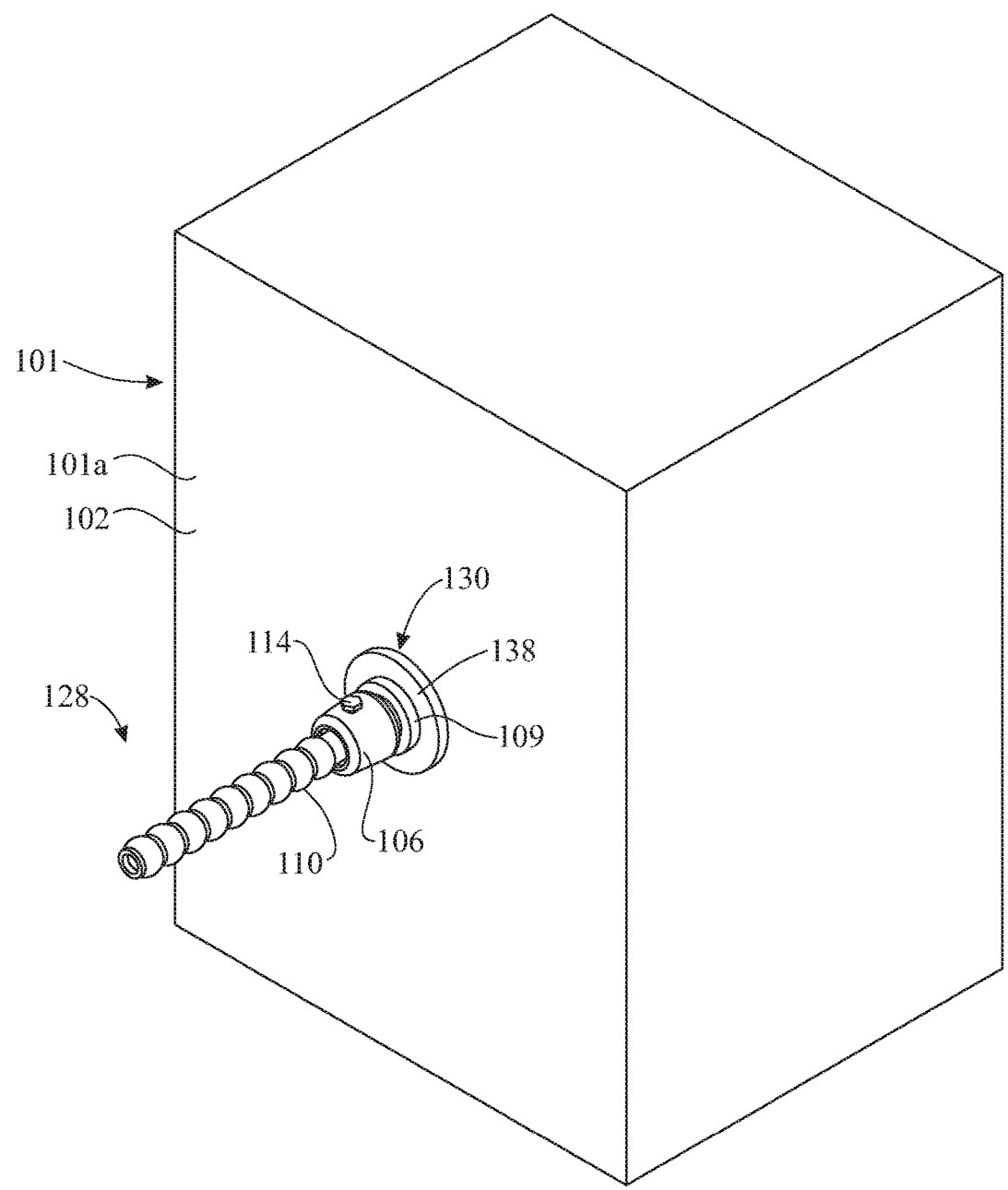
FIG. 5 presents a top, rear perspective view of a junction box installation in accordance with an exemplary embodiment of the present invention.

Referring to FIGS. 5-8, a junction box installation 128 is illustrated in accordance with an exemplary embodiment of the present invention. As shown, the junction box installation 128 is suitable to facilitate secure coupling of a flex cord 110 to a junction box 101. The flex cord 110 sheathes wires (not illustrated) which typically establish electrical connection between electrical components such as a light switch and a light in a room of a building, for example and without limitation. In typical application, the junction box 101 has already been used to establish connection between electrical components, typically using a smaller orifice (similar to orifice 104 of FIGS. 1 and 2) in the junction box 101, the smaller orifice 104 not being shown in FIG. 5. Accordingly, the junction box installation 128 may utilize the remaining large orifice 105 (shown in FIGS. 6 and 8) typically in the rear wall of the junction box 101 to establish secure connection between the flex cord 110 and the junction box 101. In typical application, the orifice 105 may have a diameter of about ¾ inches (1.905 cm). In other applications, the orifice 105 may have alternative diameters. The various components of the junction box installation 128, which will be hereinafter described, may be amenable to alternative applications not limited to securing a flex cord 110 to a junction box 101.

Figure 6:
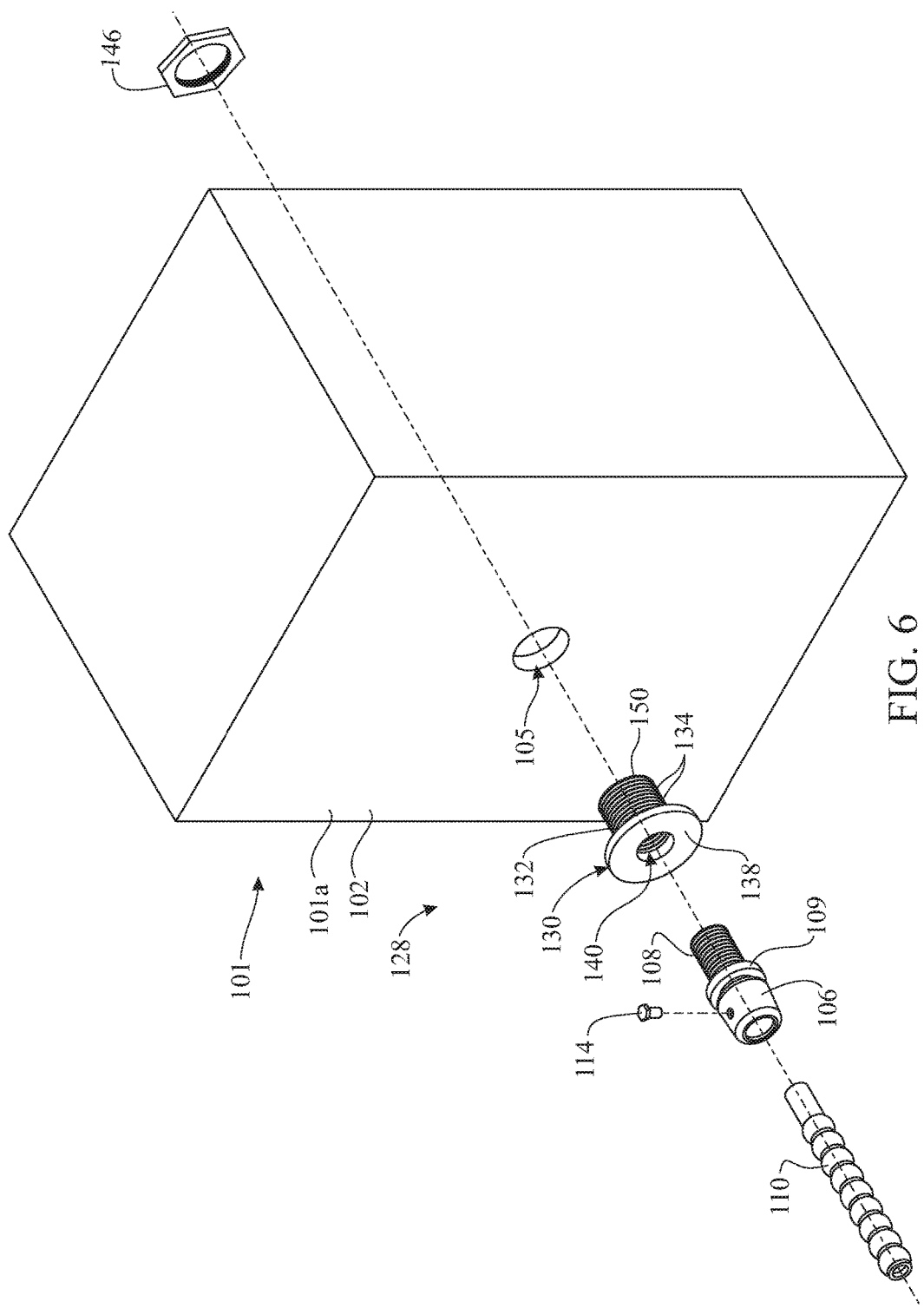
FIG. 6 presents a top, rear perspective view of the junction box installation of FIG. 5, shown exploded.
Figure 7:
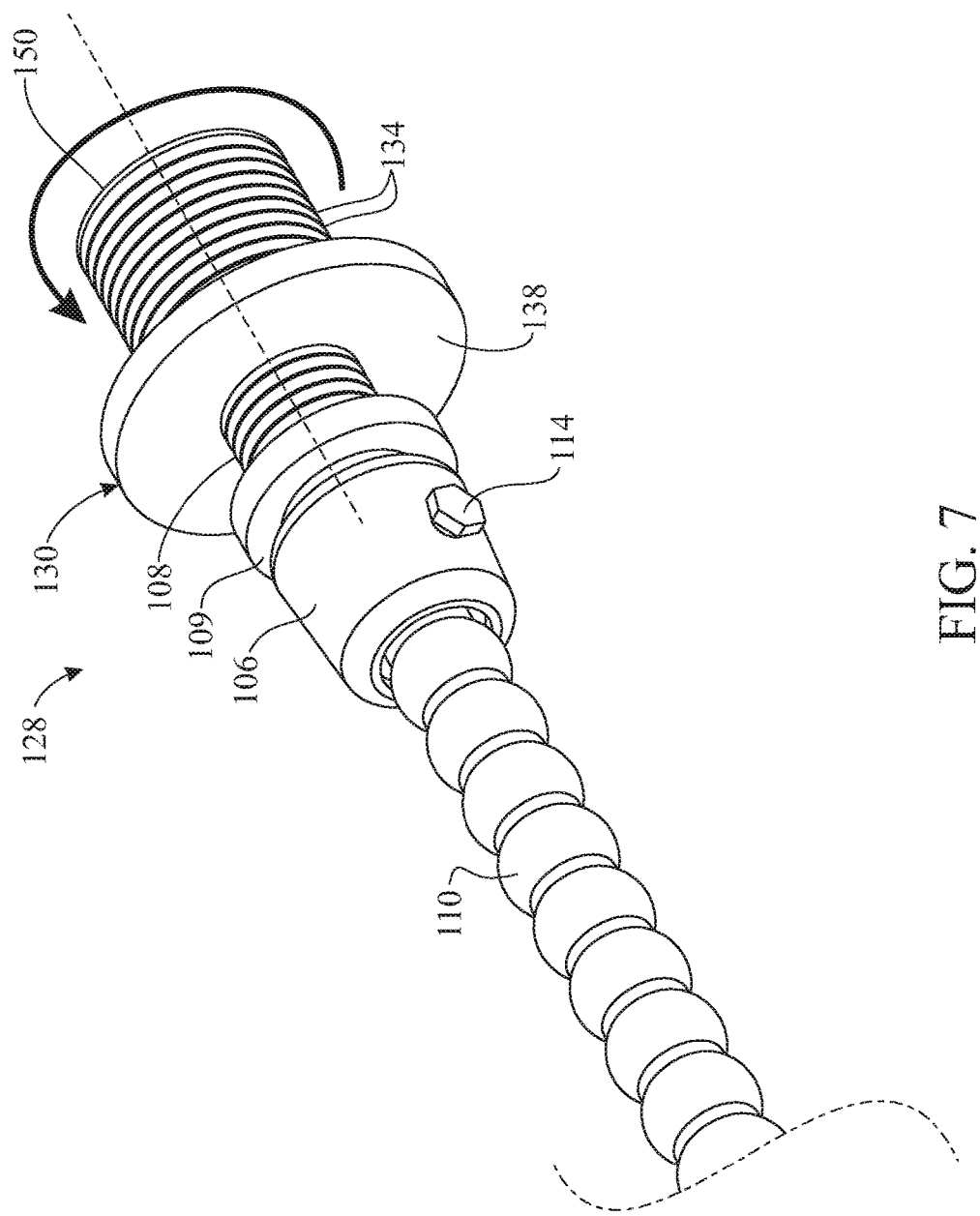
FIG. 7 presents an enlarged, top rear perspective view of the flex cord, end connector and electrical bushing of the junction box installation of FIGS. 5.
Figure 8:
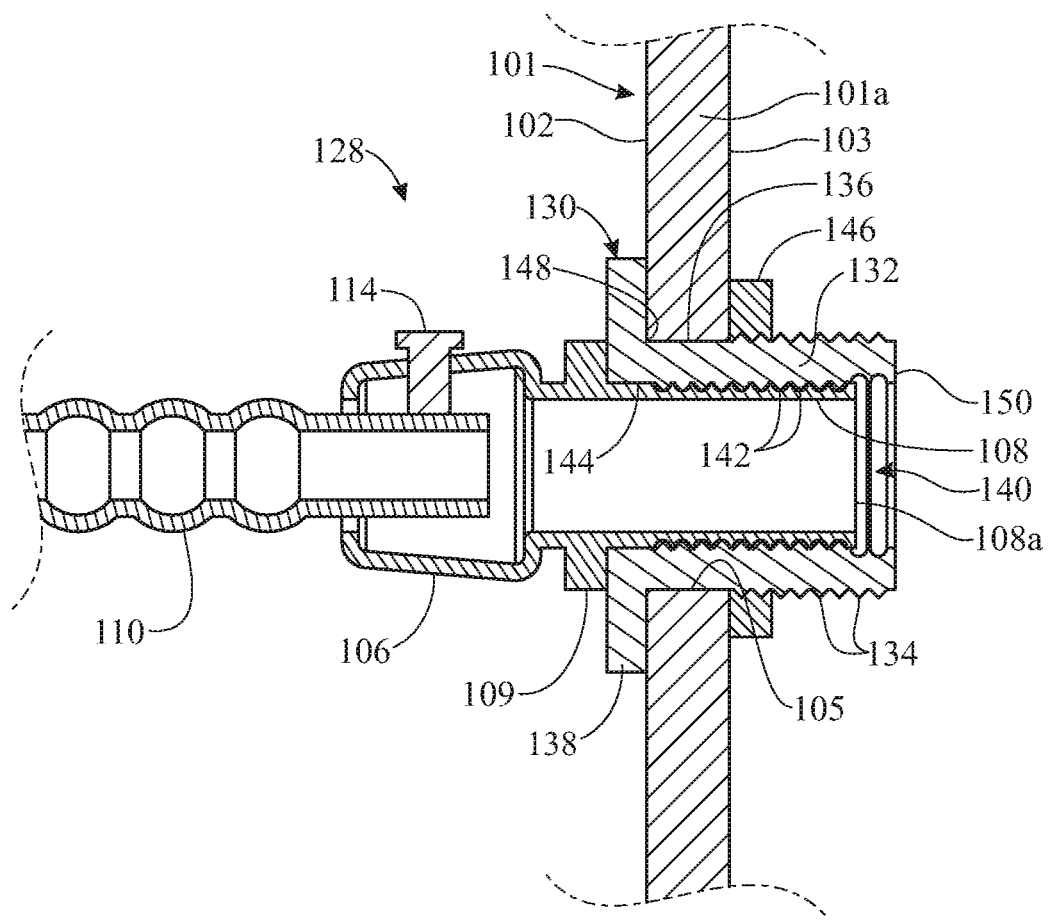
FIG. 8 presents an enlarged, cross-sectional side elevation view of the junction box installation of FIG. 5.

As best shown in FIG. 6, the junction box installation 128 includes an electrical bushing 130. The electrical bushing 130 may include a bushing body 132. As particularly illustrated in FIG. 8, the bushing body 132 may be generally elongated and cylindrical with a first or proximal end 148 and a longitudinally opposed, second end or distal end 150. A bushing flange or collar 138 may extend radially outwardly from the proximal end 148 of the bushing body 132. Exterior bushing threads 134 may be provided on the bushing body 132, for instance in spaced-apart relationship to the bushing collar 138 as shown in FIG. 8. The exterior bushing threads 134 may begin at the distal end 150 and extend toward the bushing collar 138 at the proximal end 148 of the bushing body 132. In some embodiments, the exterior bushing threads 134 may occupy at least about ½ the length of the bushing body 132 between the proximal end 148 and the distal end 150. A non-threaded orifice engaging portion 136 may extend between the exterior bushing threads 134 and the bushing collar 138 for purposes which will be hereinafter described. A through, bushing bore 140 may traverse the electrical bushing 130, i.e. the bushing collar 138 and the bushing body 132. Interior bushing threads 142 may be provided in the bushing body 132 in facing relation to the bushing bore 140. A non-threaded interior bushing shoulder 144 may extend between the proximal end 148 and the interior bushing threads 142 for purposes which will be hereinafter described. In some embodiments, the bushing body 132 may have an outer diameter of about ¾ inches to match the diameter of a typical larger orifice 105 in a conventional junction box 101 The bushing bore 140, in turn, may have a diameter of about ½ inch (1.27 cm) to match the outer diameter of a threaded, end portion 108 on an end connector 106 intended for a smaller junction box orifice (e.g. orifice 104 of FIGS. 1 and 2), for purposes which will be hereinafter described.

Accordingly, as illustrated in FIG. 8, in the junction box installation 128, which will be hereinafter further described, the bushing body 132 of the electrical bushing 130 may be inserted or extended through the orifice 105 in the junction box 101 until the bushing collar 138 typically engages the exterior surface 102 of the wall 101a of the junction box 101. The orifice engaging portion 136 on the bushing body 132 may engage the interior surface of the orifice 104. A nut 146 may be threaded on the exterior bushing threads 134 on the bushing body 132 and tightened against the interior surface 103 of the wall 101a of the junction box 101 to secure the end connector 106 in the orifice 104.

The flex cord 110 may be coupled to the electrical bushing 130 through an end connector 106, which may be standard or conventionally-sized to normally fit within a small orifice opening in the junction box 101. In typical application, the end connector 106 may receive the distal or extending end of the flex cord 110. The end connector 106 may be secured to the flex cord 110 by threading a screw 114 through a screw opening (not numbered) in the end connector 106 into engagement with the flex cord 110. The end connector 106 may have a threaded, end portion 108 as mentioned heretofore. A stop flange 109 may be provided adjacent to the end portion 108. Accordingly, as illustrated in FIG. 8, in the junction box installation 128, the threaded, end portion 108 of the end connector 106 may threadably engage the interior bushing threads 142 of the electrical bushing 130 as the end portion 108 is rotationally advanced in the bushing bore 140 until the top flange 109 on the end connector 106 engages the bushing collar 138 of the bushing 130. A non-threaded portion (not numbered) on the end connector 106 between the stop flange 109 and the end portion 108 may engage the interior bushing shoulder 144 in the bushing body 132 of the electrical bushing 130.

In typical application, the junction box installation 100 may be made by initially securing the end connector 106 on the flex cord 110. This may be accomplished by inserting the distal or extending end of the flex cord 110 in the end connector 106 and then threading the screw 114 into engagement with the flex cord 110. The electrical bushing 130 may then be coupled to the end connector 106 by inserting the end portion 108 of the end connector 106 into the bushing bore 140 of the electrical bushing 130 and rotating the threaded, end portion 108 into engagement with the interior bushing threads 142 in the bushing body 132 typically until the stop flange 109 on the end connector 106 engages the bushing collar 138 on the electrical bushing 130. The electrical bushing 130 may next be "fished" through a wall, floor, ceiling or other structure to the junction box 101 and then inserted through the orifice 140 in the junction box 101, typically until the bushing collar 138 engages the exterior surface of the junction box 101, and the orifice engaging portion 136 on the bushing body 132 engages the interior surface of the orifice 105. The nut 146 may be threaded on the exterior bushing threads 134 and tightened against the interior surface of the junction box 101.

As shown in FIG. 8, the exterior bushing threads 134 of the bushing body 132 extend longitudinally and distally beyond the end portion 108 of the end connector 106; in other words, the distal end 150 of the bushing body 132 extends distally, i.e. farther into the junction box 101, than a distal end 108a of the end portion 108 of the end connector 106. Thus, the bushing 130 in accordance with the present invention extends or increases the overall threaded length available inside the junction box 101 for attaching the nut 146, facilitating attaching the nut 146 and thus securing the bushing 130, end connector 106 and flex cord 110 to the larger orifice 105 of the junction box 101. In addition, the typically long extent of the exterior bushing threads 134 over at least half the length of the end portion 108 of the end connector 106 further contributes to facilitate rapid threading and tightening of the nut 146 on the electrical bushing 130. Accordingly, the electrical bushing 130 and the nut 146 secure the end connector 106 in the orifice 105 in the junction box 101 and prevent the end connector 106 from inadvertently falling from the orifice 105. Wires (not illustrated) may then be extended from the junction box 101 through the bushing bore 140 of the electrical bushing 130 and the flex cord 110, respectively, for connection to an electrical component (not illustrated), typically in the conventional manner.

Alternative embodiments are contemplated without departing from the scope of the present disclosure. For instance, the threated connection that attaches the bushing body 132 to the end portion 108 of the end connector 106 can be replaced with alternative connections such as having the end portion 108 frictionally fitted into the busing body 132 or having the bushing body 132 include teeth or fingers which grip the end portion 108, for instance and without limitation. This will allow the bushing 130 to serve as an adapter for an end connector 106 having an end portion 108 which is non-threaded.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An installation for extending an electrical wiring into a junction box, comprising:
   an electrical hushing including a bushing body having a proximal end, a distal end and an outer diameter corresponding to an inner diameter of an orifice in a wall of a junction box, the electrical bushing further comprising a bushing collar extending radially outward from the bushing body, a bushing bore extending through the bushing body and the bushing collar, and exterior bushing threads on the bushing body and arranged distally from the bushing collar;
   a nut configured to thread onto the exterior bushing threads on the bushing body;
   an end connector including an end portion; and
   a flex cord; wherein
   the electrical bushing, the nut, the end connector and the flex cord are configured to adopt an installed configuration in which the bushing body of the electrical hushing extends through the orifice in the wall of the junction box, with the exterior bushing threads of the bushing body protruding inwardly from an interior surface of the wall, and with the nut threaded onto the exterior bushing threads and the bushing collar and nut sandwiching the wall and holding the electrical bushing in place relative to the wall, and further in which the end portion of the end connector is received within the bushing bore and coupled to the electrical hushing and the flex cord, in turn, is coupled to the end connector.

2. The installation of claim 1, wherein the end portion of the end connector is a threaded portion.

3. The installation of claim 2, wherein, in the installed configuration, the exterior bushing threads on the bushing body extend distally from the threaded, end portion of the end connector.

4. The installation of claim 2, wherein, in the installed configuration, the threaded, end portion of the end connector is coupled to the electrical bushing by the threading of the threaded, end portion of the end connector onto interior bushing threads comprised in the bushing body and arranged facing the bushing bore.

5. The installation of claim 4, wherein the electrical bushing comprises a non-threaded interior bushing shoulder at the proximal end of the bushing body and adjacent to the interior bushing threads of the bushing body.

6. The installation of claim 1, wherein, in the installed configuration, the bushing collar rests on an exterior surface of the wall opposite to the interior surface of the wall.

7. The installation of claim 1, wherein, in the installed configuration, the nut rests on the interior surface of the wall.

8. The installation of claim 1, wherein the bushing collar is arranged at the proximal end of the bushing body.

9. The installation of claim 1, wherein the exterior bushing threads are adjacent to the distal end of the bushing body.

10. The installation of claim 1, wherein, in the installed configuration, the distal end of the bushing body protrudes distally from a distal end of the end portion of the end connector.

11. The installation of claim 1, wherein the bushing body comprises an outer, non-threaded orifice-engaging portion between the bushing collar and the exterior bushing threads, and further wherein, in the installed configuration, the orifice-engaging portion is received within the orifice.

12. The installation of claim 1, wherein the end portion of the end connector comprises a stop flange, and further wherein, in the installed configuration, the stop flange engages the bushing collar on the electrical bushing.

13. The installation of claim 1, wherein the exterior bushing threads of the bushing body cover at least half of the length of the bushing body.

14. The installation of claim 1, wherein the bushing body is elongated and cylindrical.

15. The installation of claim erein the outer diameter of the bushing body is ¾ inches.

16. The installation of claim 1, wherein the bushing bore has a diameter of ½ inch.

17. The installation of claim 1, further comprising the junction box.

18. An installation for extending an electrical wiring into a junction box, comprising:
   an electrical bushing including a bushing body having a proximal end, a distal end and an outer diameter corresponding to an inner diameter of an orifice in a wall of a junction box, the electrical bushing further comprising a bushing collar extending radially outward from the bushing body, a bushing bore extending through the bushing body and the bushing collar, and exterior bushing threads on the bushing body and arranged distally from the bushing collar;
   a nut configured to thread onto the exterior bushing threads on the bushing body;
   an end connector including a threaded, end portion; and
   a flex cord; wherein the electrical bushing, the nut, the end connector and the flex cord are configured to adopt an installed configuration in which the bushing body of the electrical bushing extends through the orifice in the wall of the junction box, with the exterior bushing threads of the bushing body protruding inwardly from an interior surface of the wall, and with the nut threaded onto the exterior bushing threads and the bushing collar and nut sandwiching the wall and holding the electrical bushing in place relative to the wall, and further in which the end portion of the end connector is received within the bushing bore and coupled to the electrical bushing and the flex cord, in turn, is coupled to the end connector, and the exterior bushing threads on the bushing body extend distally from the threaded, end portion of the end connector.

19. The installation of claim 18, wherein, in the installed configuration, the threaded, end portion of the end connector is coupled to the electrical bushing by the threading of the threaded, end portion of the end connector onto interior bushing threads comprised in the bushing body and arranged facing the bushing bore.

20. An installation for extending an electrical wiring into a junction box, comprising:
an electrical bushing including a bushing body having a proximal end, a distal end and an outer diameter corresponding to an inner diameter of an orifice in a wall of a junction box, the electrical bushing further comprising a bushing collar extending radially outward from the bushing body, a bushing bore extending through the bushing body and the bushing collar, and exterior bushing threads on the bushing body and arranged distally from the bushing collar and adjacent to the distal end of the bushing body;
a nut configured to thread onto the exterior bushing threads on the bushing body;
an end connector including a threaded, end portion; and
a flex cord; wherein
the electrical hushing, the nut, the end connector and the flex cord are configured to adopt an installed configuration in which the bushing body of the electrical bushing extends through the orifice in the wall of the junction box, with the exterior bushing threads of the bushing body protruding inwardly from an interior surface of the wall, and with the nut threaded onto the exterior bushing threads and the bushing collar and nut sandwiching the wall and holding the electrical bushing in place relative to the wall, and further in which the end portion of the end connector is received within the bushing bore and coupled to the electrical bushing and the flex cord, in turn, is coupled to the end connector, and the exterior bushing threads on the bushing body extend distally from the threaded, end portion of the end connector.

* * * * *